UNITED STATES PATENT OFFICE.

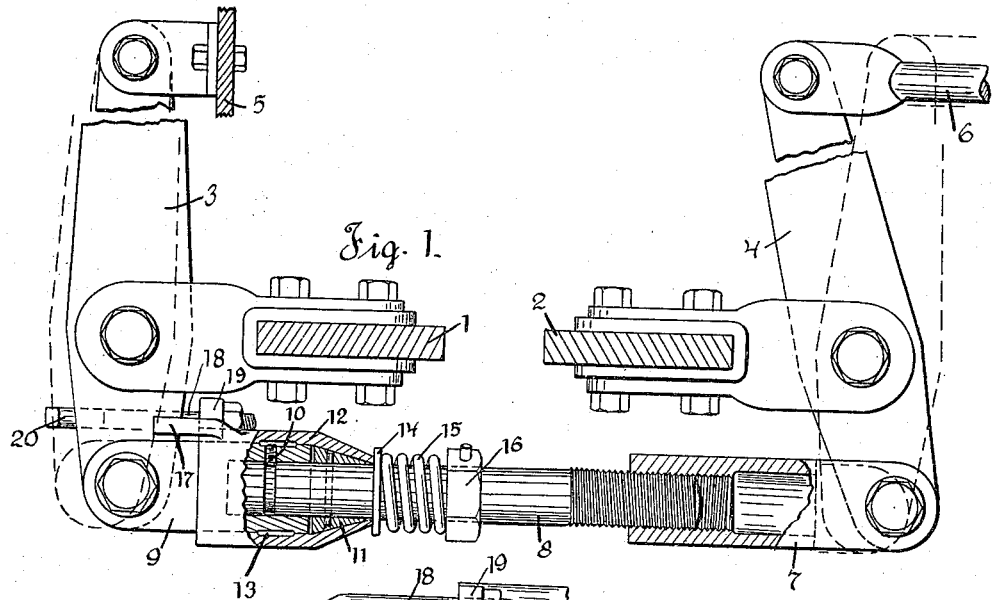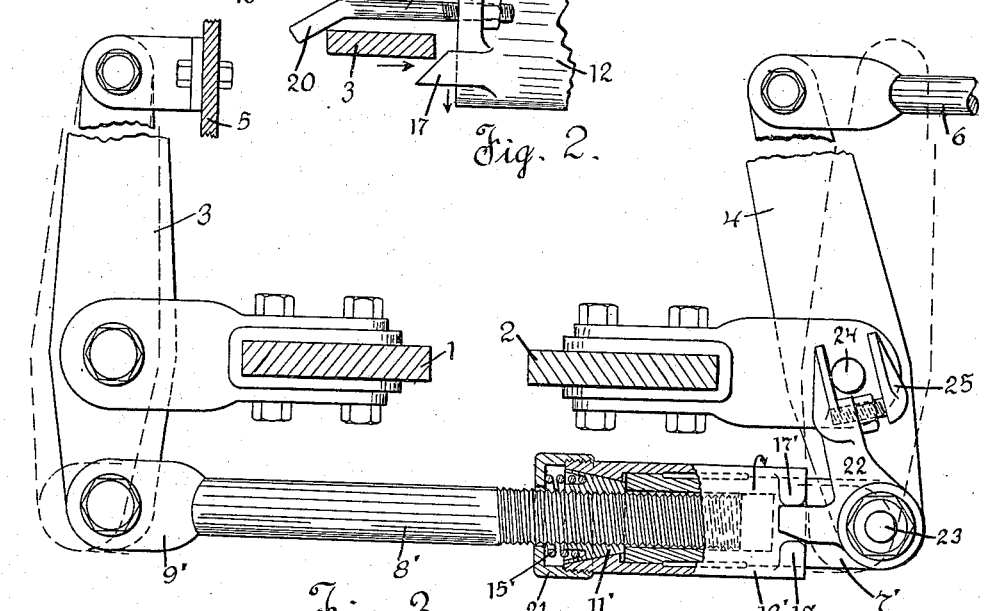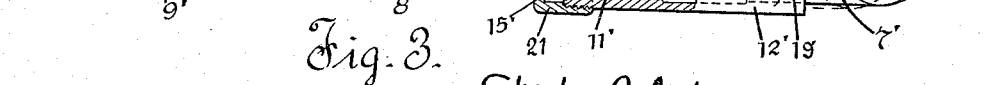

CHARLES O. ANDERSON, OF OMAHA, NEBRASKA, ASSIGNOR, BY MESNE ASSIGNMENTS, OF TWO-THIRDS TO L. D. SPAULDING.

AUTOMATIC SLACK-ADJUSTER.

1,147,777. Specification of Letters Patent. Patented July 27, 1915.

Application filed September 5, 1911. Serial No. 647,711.

*To all whom it may concern:*

Be it known that I, CHARLES O. ANDERSON, a citizen of the United States, and a resident of Omaha, in the county of Douglas and State of Nebraska, have invented certain new and useful Improvements in Automatic Slack-Adjusters, of which the following is a specification.

My invention relates to slack adjusters for railway brake rigging, and it is the object thereof to provide a simple, inexpensive and reliable device for automatically compensating in railway brake rigging for the slack caused by wear of the brake-shoes, so that clearance between the brake-shoes and car-wheels may be kept uniform, and uniform movements of the brake-actuating devices required to apply and release the brakes.

Constructions embodying my invention are shown in the accompanying drawings, in which—

Figure 1 is a side view, partly sectional, of portions of the brake rigging with my automatic slack-adjusting device applied thereto, Fig. 2 is a detail plan view of the adjusting-sleeve rotating device, and Fig. 3 is a view similar to Fig. 1 and showing a modified form of the adjuster.

In the construction shown the brakes are of the inside-hung type, the brake-beams 1 and 2 being hung between the wheels of the car-truck and connected, respectively, with the dead and live truck-levers 3 and 4. The upper end of the dead-lever 3 is connected with the truck-frame 5 and the upper end of the live-lever 4 is connected with a rod 6 which is connected with the brake-actuating devices in the usual way. It will be understood that the brake-beams may be supported, and supplied with brake-shoes and release-springs in the ordinary manner.

My invention provides means for automatically varying the length of the bottom-rod or truck-lever connection by which the lower ends of the dead and live levers are connected with each other, and in the operation of the adjusting means advantage is taken of the variation in the angular relation of the truck-levers and bottom-rod during the movements of the brakes between the applied and release positions thereof.

Referring to Fig. 1, the truck-lever connection comprises a head 7 connected with the lower end of the live-lever 4, a rod 8 having one end threaded and screwed into the head 7, and a head 9 connected with the lower end of the dead-lever and having a socket into which the end of the rod 8 extends and is rotatably retained by means of a screw 10 extending into an annular groove in the rod. On the rod 8 adjacent to the head 9 is secured a conical clutch-collar 11, and around the head is rotatably disposed the clutch-sleeve 12, an annular space 13 being formed between the parts which may be filled with a lubricant. The inner end of the clutch-sleeve fits upon the collar 11 and is engaged by a washer 14 slidably disposed on the rod 8. The washer is held in engagement with the end of the clutch-sleeve by means of a spring 15 disposed around the rod, and of which the end opposite the washer engages a collar 16 secured upon the rod. The clutch-sleeve, at the end thereof adjacent to the lever 3, is provided with a lug 17 of which the end is beveled and extends so as to be in position to engage one edge of the lever 3, as shown in Fig. 2. A finger 18 is adjustably connected with a lug 19 on the clutch-sleeve and extends alongside the lever 3, being provided with a laterally inclined end portion 20 which presents a beveled face for engagement with the edge of the lever 3 opposite the lug 17. The relations of the truck-levers to the bottom-rod connection thereof at applied and release positions of the brakes are shown in dotted and full lines, respectively, in the drawings, and from the same it will be apparent that in the moving of the brakes from one position to the other there is a change in the angular relation of the axes of the levers and bottom-rod. The length of the finger 18 is so adjusted that there is sufficient clearance between the lever 3 and the bevel faces of the finger-portion 20 and lug 17 to permit the normal movement of the lever 3, in applying and releasing the brakes, without causing the clutch-sleeve to be rotated by the engagement of the lever with said bevel faces. When there is more than the normal clearance between the brake-shoes and wheels, either from wear of the shoes or in the initial adjusting of the brakes, and consequently a greater movement of the levers is required in moving from release to applied position, then as the lever 3 moves to applied position the same engages the bevel face of the lug 17 and causes a certain rotation of the clutch-sleeve 12 upon the head 9, in the direction indicated by the arrow in Fig. 2. At the same time the longitudinal pressure upon the clutch-sleeve tends to compress the spring 15 and to loosen the frictional engagement between the sleeve and the collar 11, and the friction between the rod 8 and the heads 7 and 9 is greatly increased by reason of the longitudinal pressure to which the rod is subjected during the application of the brakes. As a result of the great amount of friction at this time between the rod and heads, and the reduced friction between the clutch members, the clutch-sleeve will slip upon the collar and will not turn the collar and the rod. When the brakes are released the clutch-collar is turned in the opposite direction by the engagement of the lever with the bevel face of the finger portion 20, and the longitudinal pressure on the sleeve tends to assist the spring 15 in causing friction between the sleeve and the clutch-collar. At the same time the friction between the engaging portions of the rod 8 and the heads 7 and 9 is reduced to a very small amount owing to the lessened stresses in the connection when the brakes are at release position. As a result of the increased friction between the clutch members and the slight friction between the rod 8 and the heads, the rotation of the sleeve causes the clutch-collar and rod to turn with it, and the connection is slightly lengthened by the turning of the threaded part of the rod 8 in the head 7. The lengthening of the connection, of course, compensates in whole or in part for the wearing of the brake-shoes, and if there remains more than a normal amount of clearance or slack the same will be compensated for by further lengthening of the connection during subsequent applications and releasings of the brakes. It will be apparent that by the use of the frictional clutch device in the adjusting connections, the slack of the brakes may be kept almost exactly the same at all times, since the slightest increase of slack over the normal amount will cause rotation of the clutch-sleeve and, no matter how slight may be the movement of the sleeve as the brakes are released, said movement may be communicated to the rod by the frictional connection.

In the modified form of the adjuster shown in Fig. 3, the head 9' is formed integrally with the rod 8' and the head 7' is bored out so as to fit slidably over the threaded portion of the rod. The clutch-collar 11' is threaded internally and is screwed upon the threaded part of the rod 8' to form an abutment against which the end of the head 7' bears. The sleeve 12' fits rotatably upon the head 7', and is provided with a cap 21 between which and the clutch-collar is placed a spring 15'. At the end of the sleeve 12' adjoining the lever 4 are the lugs 17' and 19' between which is extended the arm of a bell-crank 22 which is fulcrumed on the pin 23 which connects the lever 4 and head 7'. The other arm of the bell-crank extends upwardly and is, in effect, forked so as to straddle the pin 24 which connects the lever 4 with the brake-beam clevis. One side of the forked end of the lever is formed by a finger 25 which is adjustably connected with the body of the lever so that the space between the forks may be varied. The said space is so adjusted that more than a normal movement of the lever must occur before the bell-crank will be moved upon its fulcrum. When the movement of the lever 4 in applying the brakes is sufficient to cause a movement of the bell-crank said movement of the bell-crank causes the clutch-sleeve to be rotated slightly upon the head 7' in the direction of the arrow in Fig. 3. The amount of friction between the clutch-collar and the threaded part of the rod, and between the end of the clutch-collar and the head 7', is so great during the application of the brakes that the clutch-sleeve will slip upon the collar and the collar will not be turned upon the rod 8'. At the releasing movement of the brakes, however, the friction between the clutch-collar and rod, and between the end of the collar and the head 7' is so reduced that the friction between the clutch members is sufficient to enable the sleeve to turn the collar upon the rod 8', thus lengthening the connection and compensating for the slack of the brakes. As a means of increasing the friction between the clutch members during the movement of the bell-crank caused by releasing of the brakes, the side of the bell-crank arm engaging the lug 19' is beveled as shown, that the movement of the arm in rotating the clutch-sleeve will cause a certain end-thrust upon the sleeve tending to force it tighter upon the clutch-collar.

Now, having described my invention, what I claim and desire to secure by Letters Patent is:

1. In a slack adjuster for brake rigging, truck-levers, means connecting said levers, said connecting means including two relatively rotatable threaded parts, a frictional clutch device for rotating one of said threaded parts to vary the length of the connecting means, the clutch device having a rotatable member adjoining one of the truck-levers, means connecting said rotatable member with the truck-lever so that movement of the lever in applying and releasing the brakes may actuate said member, and means for varying said connecting means to permit normal movement of the lever without causing rotation of said member.

2. In a slack adjuster for brake rigging, truck-levers, means connecting the same, the connecting means including two threaded parts relatively rotatable to vary the length of the connection, a rotatable clutch member frictionally connected with one of the threaded parts, and means for rotating said member actuatable by a greater movement of one of the truck-lever than its normal movement in applying and releasing the brakes, said means increasing the friction between the clutch member and the part engaged thereby when the clutch member is actuated by releasing movement of the truck-lever.

3. In a slack adjuster for brake rigging, truck-levers, means connecting the same, the connecting means including two threaded parts relatively rotatable to vary the length of the connection, a rotatable clutch member frictionally connected with one of said threaded parts, and means actuated by one of the truck-levers for rotating the said clutch-member, said means increasing the friction between said clutch member and the part engaged thereby when the clutch member is actuated by releasing movement of the truck-lever and reducing the friction between the clutch member and the part engaged thereby when the clutch member is actuated by applying movement of the truck-lever.

4. In a slack adjuster for brake rigging, truck-levers, means connecting the same, the connecting means including two threaded parts relatively rotatable to vary the length of the connection, a rotatable member frictionally connected with one of said threaded parts, and means actuated by one of the truck-levers for rotating said member.

5. In a slack adjuster for brake rigging, truck-levers, means connecting the same, the connecting means including two threaded parts relatively rotatable to vary the length of the connection, one of the threaded parts having a conical part thereon, a rotatable sleeve fitting over the conical part and adapted to frictionally engage the same, and connecting means actuatable by one of the truck-levers for rotating the sleeve, the connecting means being adapted to press the sleeve longitudinally thereof to vary the pressure of the same upon the conical part engaged thereby.

6. In a slack adjuster for brake rigging, truck-levers, means connecting the same, the connecting means including two threaded parts relatively rotatable to vary the length of the connection, a rotatable sleeve, means frictionally connecting the sleeve with one of the threaded parts, and means carried by the sleeve and positioned in the path of one of the truck-levers, whereby movement of the lever may rotate the sleeve.

7. In a slack adjuster, a connecting member comprising a plurality of serially arranged relatively rotatable parts, the length of the member being variable by relative rotation of one pair of said parts but not being variable by relative rotation of another pair of said parts, and an oscillating element engaging one of the rotatable parts and constantly tending to move said part with it, said oscillating element moving in opposite directions as the longitudinal stress in the member is increased and decreased.

8. In a brake rigging, brake-levers, a connecting member having heads connected with said brake-levers and an intermediate part movable relatively to the heads to vary the length of the member, an element engaging the intermediate part, means for actuating said element in alternate directions as the brakes are applied and released, and means for causing a friction between the said element and the intermediate part greater than that between the intermediate part and the heads when the brakes are released and less than that between the intermediate part and the heads when the brakes are applied.

9. A member connecting moving parts and having heads connected with said moving parts, and an intermediate part between the heads movable relatively thereto to vary the length of the member, an element engaging said intermediate part, means connected with one of the moving parts for actuating said element in alternate directions, and means for causing friction between said element and the intermediate part less than that between the intermediate part and the heads when the moving parts are actuated in one direction and greater than that between the intermediate part and the heads when the moving parts are actuated in the other direction, whereby the movement of said element causes movement of the intermediate part in one direction only.

In testimony whereof I have hereunto subscribed my name in the presence of two witnesses.

CHARLES O. ANDERSON.

Witnesses:
 M. L. HYDE,
 A. A. McCLURE.

Copies of this patent may be obtained for five cents each, by addressing the "Commissioner of Patents, Washington, D. C."